Dec. 15, 1931.  J. A. GANSTER  1,836,112
METHOD OF TRUING RINGS
Filed Aug. 22, 1928   3 Sheets-Sheet 1
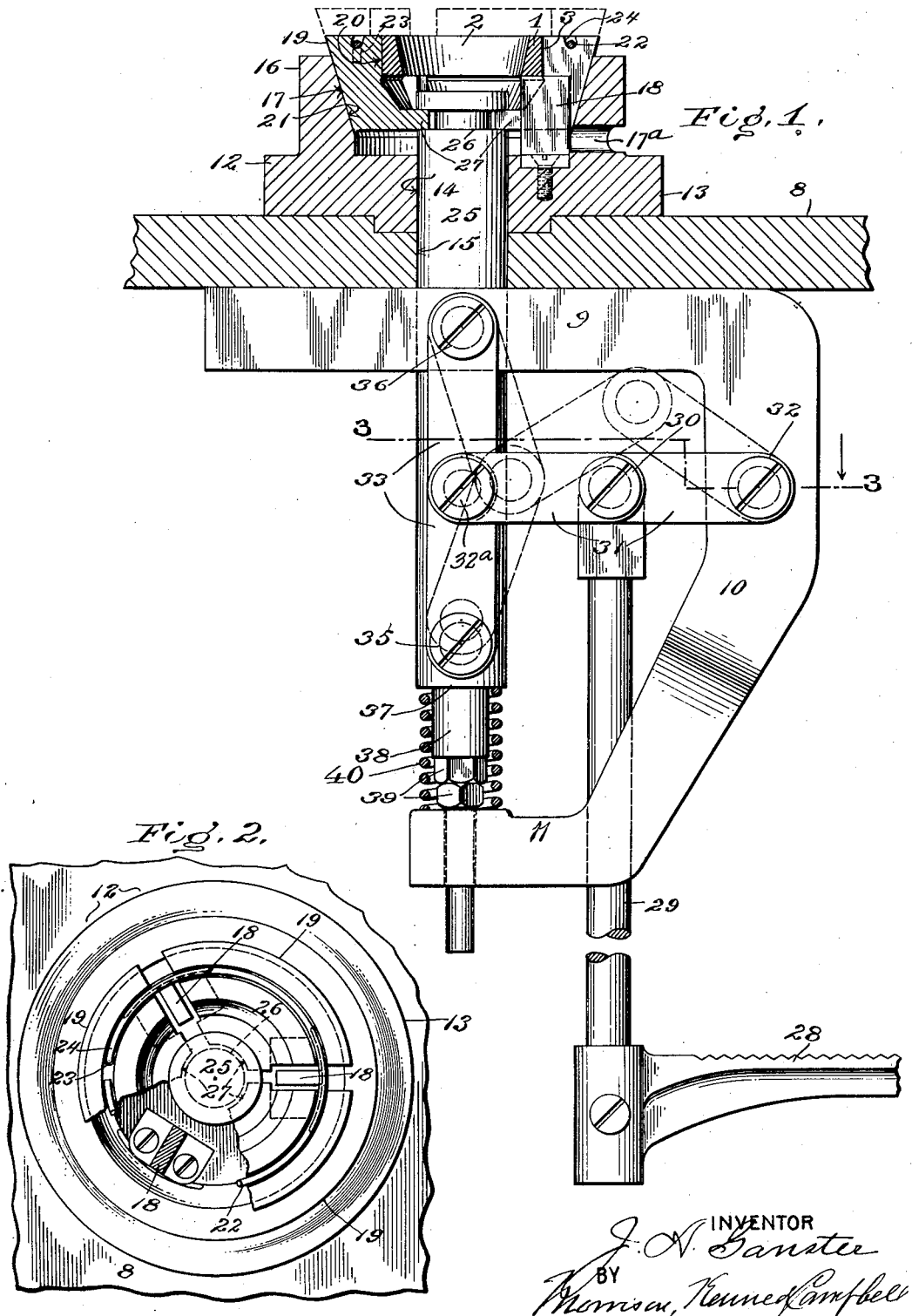

Dec. 15, 1931.   J. A. GANSTER   1,836,112
METHOD OF TRUING RINGS
Filed Aug. 22, 1928   3 Sheets-Sheet 2
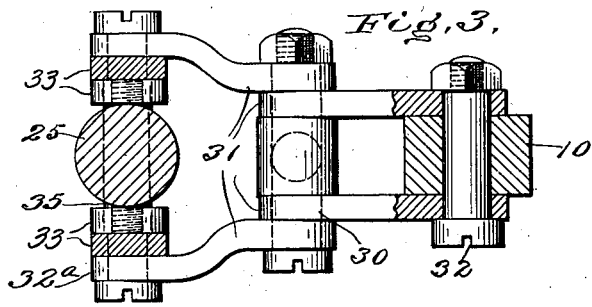
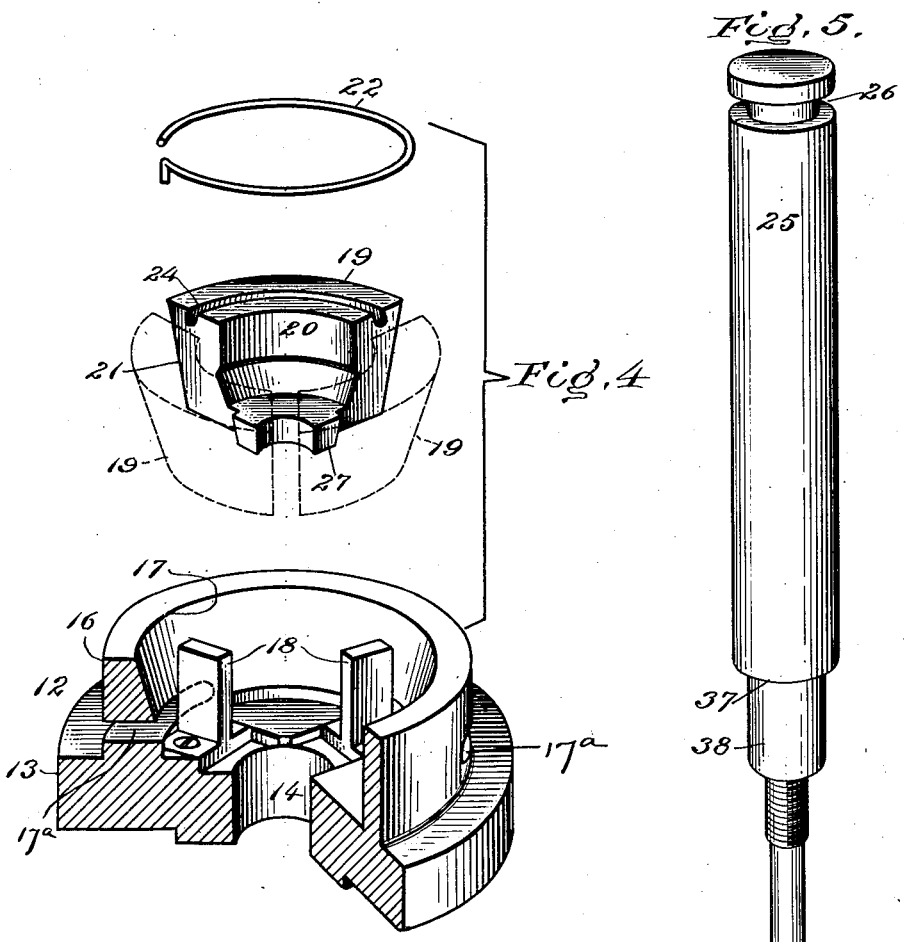

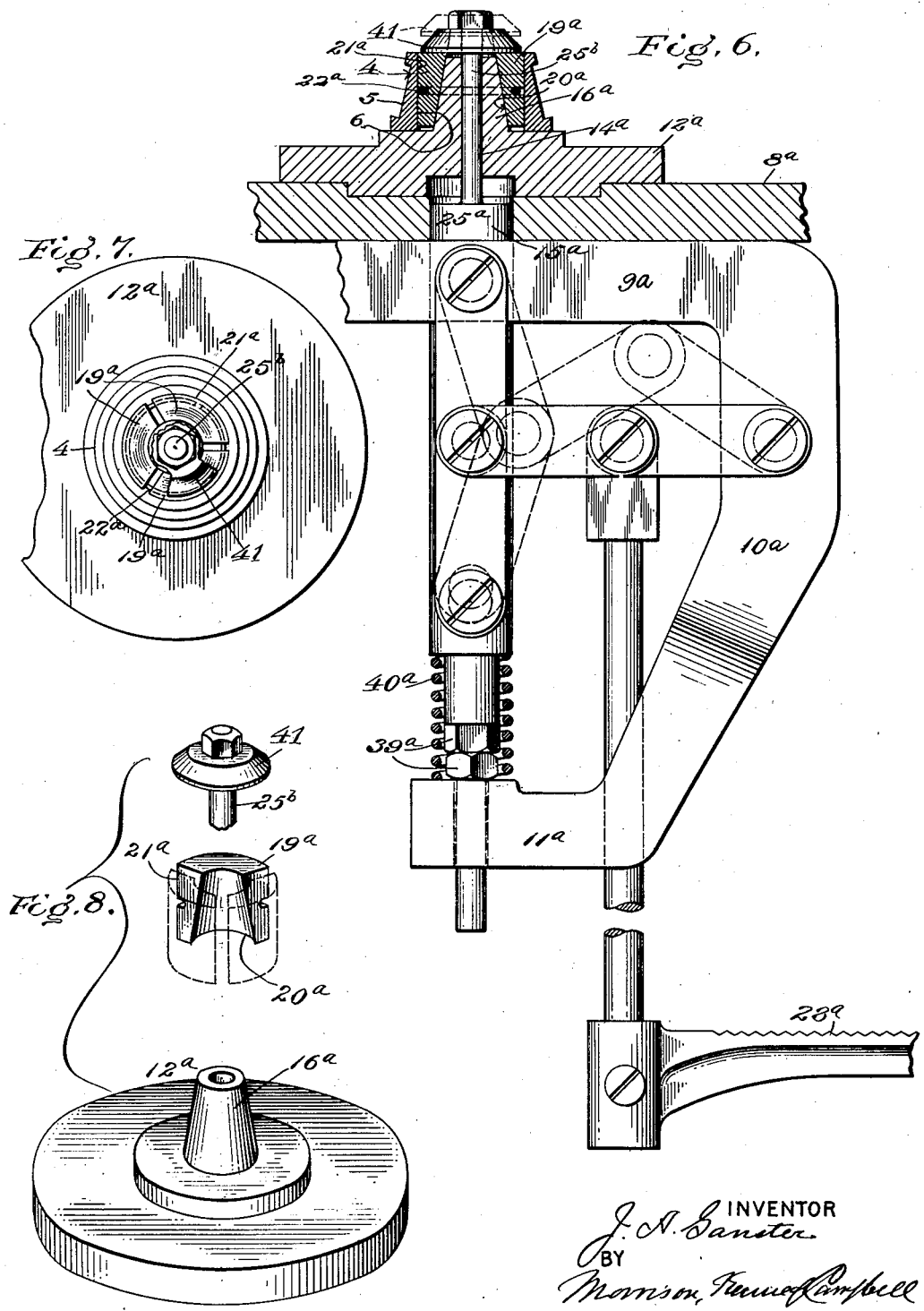

Patented Dec. 15, 1931

1,836,112

UNITED STATES PATENT OFFICE

JOSEPH A. GANSTER, OF PHILADELPHIA, PENNSYLVANIA

METHOD OF TRUING RINGS

Application filed August 22, 1928. Serial No. 301,257.

This invention relates to the treatment of rings to true and give them a circular form, and involves the subjection of the ring to powerful pressure exerted radially thereof entirely around the same by suitable pressure devices which, in acting on the ring, will present a true circular contour or pressure surface and will give the ring a similar accurate and true circular form.

While applicable to the treatment of rings generally, which under their conditions of use require accuracy in their circular form or contour, the invention has particular reference to the treatment of the rings of anti-friction bearings, which bearings comprise an inner ring provided with an external raceway surface, an outer surrounding ring provided with an internal raceway surface, and intermediate rolling elements, either balls or rollers, traveling on said surfaces; and the present invention consists of an improved method of treatment, to carry out the above mentioned objects.

In accordance with the invention, the ring with its raceway surface formed by the usual machining operations, is supported on end in heated condition with its raceway surface exposed and free from contact with extraneous objects, and by suitable pressure members, presenting conjointly an accurate circular pressure surface and disposed either within the ring or outside the same, according as to whether an inner ring or an outer ring is being treated, the ring is subjected to powerful pressure exerted radially thereof, whereby the ring and the machined raceway surface thereon will be given a corresponding true and accurate circular form, the exposed raceway surface being at or about the moment of the application of said pressure, subjected to the action of a cooling medium, as a result of which, the said surface will be hardened uniformly and without the formation of soft spots therein, and the ring will contract and will thereby conform to the final predetermined circular dimensions as determined by the circular contour of the pressure members.

In the specification to follow, the said invention will be described in detail, and the novel features thereof will be set forth in the appended claims.

In the accompanying drawings:

Fig. 1 is a vertical sectional elevation of my improved apparatus in the form designed for the treatment of the outer rings of anti-friction bearings;

Fig. 2. is a plan view of the same with the bearing ring omitted;

Fig. 3 is a sectional elevation on the line 3—3 of Fig. 1;

Fig. 4 is a fragmentary perspective view of certain parts of the apparatus, separated from each other;

Fig. 5 is a perspective view of the operating stem for the pressure members, separated from its associated parts;

Fig. 6 is a view similar to Fig. 1, showing the apparatus in a form adapted for acting on the inner rings of anti-friction bearings;

Fig. 7 is a plan view of the same; and

Fig. 8 is a fragmentary perspective view of certain parts of said apparatus, separated from each other.

Referring to the drawings.

In carrying the improved method into effect, the bearing ring being previously heated, either the outer ring 1 of a bearing with its inner raceway surface 2 and its cylindrical external surface 3 as shown in Fig. 1, or the inner ring 4 of a bearing with its outer conical raceway surface 5 and its inner cylindrical surface 6 as shown in Fig. 6, is supported on end in position to be acted on, with its raceway surface exposed and free of contact with extraneous objects. The heated ring is now subjected to powerful truing pressure exerted entirely around the ring and radially thereof, by means which will engage the side of said ring opposite its raceway, said means engaging the outer side of an outer bearing ring as shown in Fig. 1, or the inner side of an inner bearing ring as shown in Fig. 6. The pressure applying means is formed where it engages the ring, to present an accurate and true circle, and it is operated with reference to a ring of a given diameter, to move radially to a predetermined point or extent in applying the truing pressure, the circular contour presented by the pressure means at that point of its movement being the final diameter or size that it is desired that the ring should have. The heated ring and the raceway surface thereof when subjected to truing pressure under these conditions, will be given a true circular form and a definite predetermined sized. At or about the moment of application of the pressure, but preferably simultaneously therewith, a cooling medium, for instance water, is applied to the exposed raceway surface of the ring, the effect of which will be to harden said surface uniformly and evenly throughout its extent, without leaving any soft spots therein, such as would result if the raceway surface were brought into contact with any extraneous objects, and the further effect of which cooling medium is to cause the ring to contract, the pressure means moving inwardly with the contracting ring in the case of an outer ring, and moving outwardly as the ring contracts toward it, in the case of an inner ring. The effect of the contraction of the rings in both cases is that, when the ring has become cold and has fully contracted, it will, by reason of the cooperative action of the truing pressure, assume a final set of true and accurate circular form, in which the raceway surface will be of similar true and circular contour, and a hardened trued ring will be provided without the necessity of resorting to the time consuming and expensive grinding operations which have heretofore been required in the production of bearing rings.

Two forms of apparatuses are shown for carrying the above described method of treatment into effect, one form, that shown in Figs. 1 to 5, for treating outer bearing rings, and the other form, that illustrated in Figs. 6 to 8, for treating inner bearing rings.

Referring particularly to Figs. 1 to 5, the operative parts of the apparatus are mounted in and sustained by a suitable frame comprising a bed plate 8 having fixed to its under side two parallel frame bars 9, only one of which is shown from one end of which, an arm 10 extends downwardly and at its lower end is extended horizontally as at 11, so as to underlie the bars 9.

Seated on and fixed to the bed plate 8 is an annular member or block 12 of the detailed form best shown in Fig. 4, and comprising a base portion 13 containing a circular opening 14 in alinement with a similar opening 15 in the base plate 8, the purpose of which openings will presently appear, and an upstanding flange 16 whose inner surface 17 is sloped or inclined from its upper edge inwardly toward the center of the block. A number of posts 18, three in the present instance, extend upwardly from the bottom of the annular member some distance inward of its sloping surface to afford a seat for the ring 1 to be treated, which ring being seated on the upper ends of the posts will be supported on end, with its inner raceway surface exposed and free from contact with any extraneous objects.

Disposed in the spaces between the posts, are three segmental pressure members or jaws 19, of the detailed form shown in Fig. 4, which members are curved on their inner sides as at 20 to fit around and engage the outer cylindrical surface of the ring, and have their outer sides sloping axially as at 21 to fit within and cooperate with the sloping surface 17 of the annular member 12. These pressure members when assembled between the posts and around the bearing ring as shown in Figs. 1 and 2, will present on their inner sides a true circular contour, and by moving said members as a unit axially within the annular member, the said sloping surfaces cooperating with each other will cause the segmental members to be moved radially, the downward movement of the members causing them to move radially inwardly and apply pressure to the ring, and the upward movement of the members permitting them to be moved outwardly from each other to release the ring. This outward movement of the segmental members is effected in the present case by means of a torsion spring 22 which is anchored at one end, as at 23, in a groove in the upper side of one of the segmental members and engages in grooves 24 in the other members, and thus tends to spread the members apart as they are moved upwardly axially.

The segmental members may be moved axially by any suitable form of operating means to effect their radial movement, so as to apply powerful pressure to the bearing ring, and in the drawings I have illustrated one form of such operating mechanism, although it is obvious that other forms may be employed without departing from the limits of the invention. On reference to Fig. 1, it will be seen that an operating stem 25 extends upwardly loosely through the alined openings 14 and 15, and has its upper end interlocked with the segmental pressure members in such manner that the axial movement of the stem will move the segmental members axially, while at the same time said members will be permitted to move radially relatively to the stem. This interlocking of the stem with the segmental members is effected in the present instance by forming in the upper end of the stem an annular open groove 26, in which are loosely engaged fingers 27 extending inwardly from the lower ends of the segmental members, the depth of the groove being such as to permit sufficient movement of the fingers in the groove radially, to enable the pressure members to function as above described in applying radial pressure to the ring when said members are moved axially.

The stem is moved downwardly to operate the pressure members to apply the truing pressure, in the present instance by means of a foot pad 28 on the lower end of a rod 29, whose upper end is pivoted as at 30 to two pairs of horizontal toggle links 31 at the point of pivotal connection of said links with each other, which pairs of toggle links are pivoted at one end, as at 32, to the frame arm 10, and are pivoted at their opposite end, as at 32ª, to two pairs of vertical toggle links 33 at the point of the pivotal connection of said vertical toggle links with each other. The lower ends of the pairs of vertical toggle links are pivoted to the stem 25 as at 35, and their upper ends are pivoted to the sides of the horizontal frame bars 9, as at 36. Near its lower end, the stem is formed with a shoulder 37, and beyond the shoulder with a reduced threaded terminal portion 38 on which are screwed nuts 39 in position to engage the terminal portions 11 of the arm 10 in the downward movement of the stem and thus limit such movement; and a spiral spring 40 surrounds the stem between the shoulder 37 and the terminal portions 11 of the arm 10, to move the stem upwardly after being depressed by the foot pad.

In the operation of the mechanism, with the segmental pressure members in their upper position as shown by dotted lines in Fig. 1, and held up by the spring 40, and spread apart by the torsion spring 22, in which position of the parts the two pairs of angularly related toggle links are "broken", as shown by dotted lines in Fig. 1, the bearing ring 1, after being first heated, is seated on the supporting posts 18, and the foot pad 28 is depressed. This movement of the foot pad will straighten out the toggle links as shown by the full lines in Fig. 1, with the result that the stem 25 will be moved downwardly under powerful force, and the pressure members will be correspondingly moved downwardly in an axial direction. Such movement of the pressure members, will, due to the cooperation of the sloping surfaces 20 thereon with the sloping surface 21 of the annular surrounding member 12, move the pressure members inwardly radially, and they will engage and act with powerful truing pressure on the ring. Such movement of the parts, and the pressure on the ring, will continue until the stop nut 39 brings up against the terminal portion 11 of the arm 10, which will determine the final set of the ring in effecting the truing operation; and at or about the time of the application of the pressure on the ring, a cooling medium, such as water, is applied to the exposed raceway surface of the ring to harden the same and cause the ring to contract or set, the flange 16 of the annular member 12 being provided with a number of holes 17ª for the escape of the cooling water.

In the truing of an inner bearing ring, the general method of treatment is the same as that just described, except that the segmental pressure members are arranged to act on the interior of the ring instead of on its exterior. The form and construction of the parts to effect this action are shown in Figs. 6 to 8, where it will be seen that the inner bearing ring 4 is supported on end on a circular supporting plate 12ª, which in turn is supported on a frame plate 8ª. A conical head 16ª provided with outwardly and downwardly sloped sides, extends upwardly from the plate 12ª and centrally within the bearing ring, and is formed with a central opening 14ª, which alines with an enlarged opening 15ª in the plate 8ª. A series of (three in the present instance) segmental pressure members 19ª is disposed around the conical head within the ring 4, the outer sides of which members are curved as at 21ª to conjointly present a circular pressure surface to engage the inner cylindrical surface of the bearing ring, and the inner sides of which are sloped as at 20ª to engage and cooperate with the sloping surface of the conical head. The form and arrangement of these parts are such that, when the pressure members are moved axially downwardly as a unit on the conical head, the said sloping surfaces cooperating with each other will move said members radially outwardly and will thereby apply truing pressure to the interior of the ring, and when moved upwardly, the pressure members will be permitted to move inwardly radially towards each other to release the ring.

Movement of the pressure members axially is effected by means of an operating stem 25ª guided to move vertically in the supporting frame and formed on its upper end with a reduced portion 25ᵇ extending loosely through the said openings 14ª and 15ª, a head 41 being fixed to the upper end of said reduced portion, and adapted in the downward movement of the stem to engage the upper ends of the segmental members and move the same downward axially, whereby said members will be caused to move outwardly radially and will apply truing pressure to the bearing ring. Such downward movement of the operating stem is effected by means of a toggle-link system as shown, similar to that previously described, and operated by a similar foot pad 28ª. On the upward movement of the operating stem by the spring 40ª, the head 41 will be disengaged from the upper ends of the pressure members as shown by dotted lines in Fig. 6, whereupon the latter will be drawn inwardly towards each other, by means of a compression spring 22ª surrounding the pressure members as shown, and at the same time will ride up on the conical head.

It will be understood that in the operation of this form of the apparatus, with the operating stem in its raised position and the pressure members in their raised position and contracted by the spring 22ª, the bearing ring 4 in heated condition is seated around the contracted pressure members and upon the supporting surface of the circular plate 12ª. The foot pad 28ª is now depressed, which action will straighten out the toggle links and move the stem downwardly and thereby move the pressure members downwardly axially and expand them forcibly within and in engagement with the interior of the ring, so as to apply a truing pressure thereto. The downward movement of the stem is limited, as in the first instance described, to give the final true circular set to the bearing ring, by means of the nut 39ª in its engagement with the terminal portion 11ª of the frame arm 10ª. In the operation of the apparatus just described, it will be understood that, as in the first instance described, a cooling medium is applied to the bearing ring as the same is subjected to the truing pressure, the raceway surface 5 of the ring being exposed and free from contact with any extraneous objects, so that there will be no soft spots left in the hardened surface.

While in the foregoing description and accompanying drawings the invention has been described as applied specifically to the treatment of the rings of anti-friction bearings to true the same, it will be manifest that the method of procedure and apparatus may be employed to true other forms of rings where accuracy in their circular contour is demanded; and it will be understood further that the detailed form of the apparatus shown may be variously modified without departing from the spirit of the invention; and further, that the invention is not limited to any particular form or construction of the parts, except in so far as such limitations are specified in the claims.

Having thus described my invention, what I claim is:—

1. The method of treating bearing rings having raceways, to true and harden the same, which consists in heating the ring, supporting the same in a fixed predetermined position to be acted on, with its raceway free of contact with extraneous objects subjecting the surface of the ring opposite its raceway to pressure exerted radially therearound to a predetermined extent to give the ring a true circular form, and at the moment of application of the pressure, applying a cooling medium to the raceway to harden the same; whereby said raceway will be given a true circular form and size and the hardened surface thereof will be free from soft spots.

2. The method of treating bearing rings having internal raceways, to true and harden the same, which consists in heating the ring, supporting the same with its raceway surface free of contact with extraneous objects subjecting the exterior of the ring to pressure exerted radially inwardly therearound to an extent to give the same a true circular form, and at the moment of application of the pressure, applying a cooling medium to the exposed raceway surface, whereby said raceway will be given a true circular form and the hardened surface will be free from soft spots.

In testimony whereof, I have affixed my signature hereto.

JOS. A. GANSTER.